Feb. 13, 1962   J. A. O'NEIL   3,020,668
FISHING LURE
Filed Dec. 18, 1957

INVENTOR.
JOHN A. O'NEIL
BY
ATTY.

United States Patent Office 3,020,668
Patented Feb. 13, 1962

3,020,668
FISHING LURE
John A. O'Neil, 1805 Preston, Akron, Ohio
Filed Dec. 18, 1957, Ser. No. 703,568
3 Claims. (Cl. 43—42.16)

This invention relates to fishing lures and more particularly to a fishing lure designed to skim the water surface with great agitation as it is pulled in by the fisherman.

An object of the present invention is to provide a fishing lure which is inexpensive and simple in construction. A further object of the invention is to provide a fishing lure which has a shape such that it will avoid accumulating weeds as it moves through the water. Yet another object of the invention is to provide a fishing lure comprising a spoon having its forward end enveloped by a rotating spinner. Yet a further object of the invention is to provide in a fishing lure a spoon mounting a shank and having a spinner revolving at its forward end so arranged that the revolving hub of the spinner bears directly against the forward end of the spoon. Yet another object of the invention is to provide in a fishing lure a spoon with a keel and longitudinally mounting a shank upon which rotates a frusto-conical shaped hub having spinner blades protruding therefrom.

Figure 1:
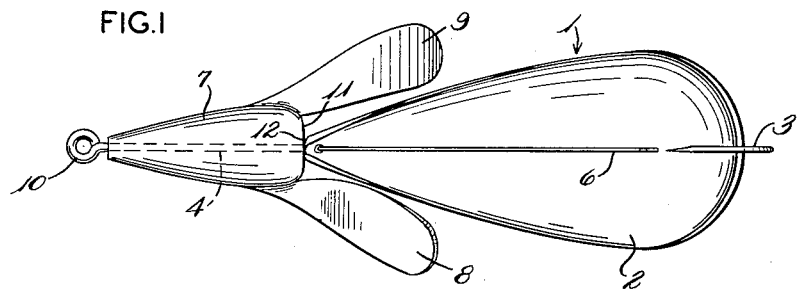
Figure 2:
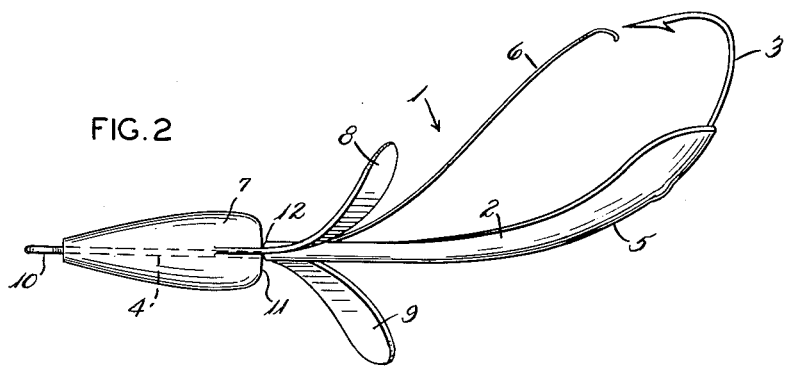
Figure 3:
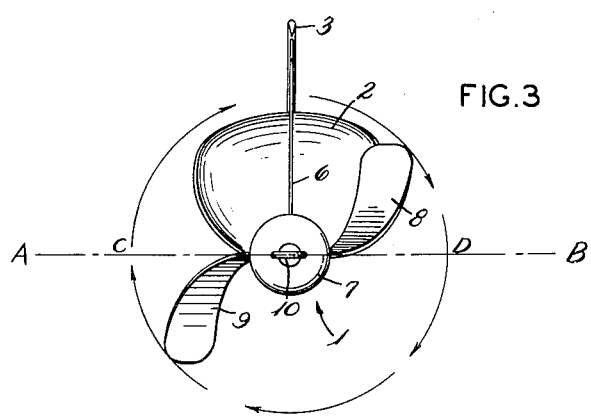

These and other objects of the invention will be more readily understood with reference to the specification, claims and drawings of which:

FIGURE 1 is a plan view of a lure of the invention.
FIGURE 2 is a side view of the lure of the invention.
FIGURE 3 is a front view of a lure of the invention.

Referring to the figures of drawing, a fishing lure generally indicated at 1 is comprised of a spoon 2 of metal or the like centrally and longitudinally mounting a hook 3 which has a shank end 4 protruding beyond the forward end of spoon 2 and terminating in eye 10. The shank 4 may be either a part of hook 3 or a separate member secured to the longitudinal backbone of the spoon. Rotatably mounted on shaft 4 is a frusto-conical shaped hub 7 of metal or the like from which protrudes a pair of diametrically opposed spinner blades 8 and 9. In the preferred form of the invention the spinner blades are secured to and at their bases merged into the hub 7 so that the base of each blade joins the hub on a common plane through shaft 4. Such a plane is represented in section by lines A—B (FIG. 3). Blades 8 and 9 perform three functions in combination with the other elements of the lure. First they cooperate with the hub 7 and spoon 2 in a manner to be described to keep the lure weed-free. Secondly the blades help to stabilize and guide the lure to the surface once the direction of the lure is set by reeling in line, and third the blades beat the water with a whirling sound once the lure has surfaced.

To supplement the other weedless features of the lure 1 a wire 6 protrudes backward and upward from the forward end of spoon 2 to the point of hook 3. To add stability to the lure the bottom of spoon 2 merges with and into a keel 5.

Reference to FIGS. 1 and 3 shows that the lure is streamlined from front to rear with the surface contour of frusto-conical shaped hub 7 sweeping upward and backward to merge into the rearwardly sweeping lines of blades 8 and 9. It will be seen that in the form of the invention shown in the drawings, blades 8 and 9 flare diametrically outward from shank 4 past the widest point on the edge of spoon 2. The shapes of the hub and blades serve to guide weeds away from the forward end of spoon 2. The shape of the spoon 2 is such that should any weeds pull back and in past blades 8 and 9 they will slide around the edge of the spoon and avoid hook 3. A critical feature of the invention lies in the arrangement of blades 8 and 9 so that they, in effect, "lay back" past the forward end of spoon 2. In the preferred form of the invention the blades 8 and 9 extend rearwardly at least one fifth of the projected length of the spoon while flaring out a distance, C—D (FIG. 3), slightly greater than the width of the spoon. Also in the preferred form of the invention the innermost edges of blades 8 and 9 pass in revolution very close to the edge of the spoon 2 to avoid weed trapping and pickup between the spoon and the blades. In fact the only clearance necessary in this form of the invention is just enough to permit free rotaiton of the blades. Because of other elements of the combination, some advantages of the invention can be obtained with less blade "lay back" than ⅕ of the length of the spoon and an effective "flare out" or blade width similar to C—D of FIG. 3 less than the width of the spoon.

The weedless features of the lure are enhanced by the novel arrangement of hub 7 with respect to spoon 2. Whereas prior-art lures rely on glass beads or other undesirable weed accumulating antifriction devices to separate a rotating member from a stationary member on a shank, such as 4, the base 11 of frusto-conical shaped hub 7 bears directly against the forward end 12 of spoon 2. Hub 7 preferably is hollow and provided with holes, not shown, slightly larger than shank 4 at the forward and base end to facilitate rotation of the hub from urging by blades 8 and 9 as the lure is pulled through the water. Since the base 11 of hub 7 is wider than the forward end of the spoon and since that end is nuzzled against the hub base when the lure is drawn through the water, there is no chance of weed pick-up by the spoon end.

The leading surface of the spoon may be rolled to make a round bearing surface, although hub 7 will rotate freely even if end 12 is in the form of an edge.

In operation the fisherman throws the lure out with a casting rod and draws it back by reeling in line. The lure sinks until line is drawn in at which time it will turn over with hook 3 up and plane to the surface of the water through the action of the undersurface of spoon 2 and blades 8 and 9. Once on the surface the lure will skim along with blades 8 and 9 partially above the surface beating and whirling with a splashing sound designed to excite and attract fish. This action of blades together with the shape of the blades and the spoon permit the lure to skim across the surface of heavy weed beds without picking up weeds. The hook is protected from weeds by wire 6 and is held high because the spoon is stabilized in an upright position by its keel 5.

The surface of the hub 7, blades 8 and 9 and spoon 2 may be brightly colored or silver plated as desired to increase the lures attraction to fish. Also, if desired a pork rind or other bait may be attached to hook 3 in use of the lure.

What is claimed is:
1. A fishing lure comprising, in combination, a tapered-end spoon, a hook mounted on said spoon, a shank rigidly mounted on and protruding from the tapered end of said spoon, and a frusto-conical hub having a rearwardly closed base journaled for rotation on said shank and against the said end of said spoon, and spinner blades on said hub extending axially a substantial distance beyond the said end of said spoon, whereby said end of said spoon and said base of said hub, and said axially extending spinner blades cooperate to provide weed-free operation.

2. A fishing lure as in claim 1, wherein said spinner blades each merge with said hub along a line lying in a plane extending axially of said hub.

3. A fishing lure as in claim 1, wherein said spinner blades extend from opposite sides of said hub.

References Cited in the file of this patent

UNITED STATES PATENTS

| | | |
|---|---|---|
| 861,116 | Heddon | July 23, 1907 |
| 1,116,025 | Cripe | Nov. 3, 1914 |
| 1,535,957 | Stanley et al. | Apr. 28, 1925 |
| 2,145,283 | Accetta | Jan. 31, 1939 |
| 2,180,822 | Gruenhagen | Nov. 21, 1939 |
| 2,281,809 | Smith | May 5, 1942 |
| 2,319,026 | Adam | May 11, 1943 |